United States Patent
Zhan et al.

(10) Patent No.: US 10,717,879 B2
(45) Date of Patent: Jul. 21, 2020

(54) SHELF-STABLE AQUEOUS COMPOSITION AND PROCESS OF MAKING THE SAME

(71) Applicants: Dow Global Technologies LLC, Midland, MI (US); Rohm and Haas Company, Collegeville, PA (US)

(72) Inventors: Fu Zhan, Shanghai (CN); Baoqing Zheng, Shanghai (CN); Zhi Gang Hua, Shanghai (CN); Yaobang Li, Shanghai (CN); Yurun Yang, Shanghai (CN)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 66 days.

(21) Appl. No.: 15/761,540

(22) PCT Filed: Sep. 30, 2015

(86) PCT No.: PCT/CN2015/091175
§ 371 (c)(1),
(2) Date: Mar. 20, 2018

(87) PCT Pub. No.: WO2017/054156
PCT Pub. Date: Apr. 6, 2017

(65) Prior Publication Data
US 2018/0340077 A1 Nov. 29, 2018

(51) Int. Cl.
*C09D 5/02* (2006.01)
*C09D 133/06* (2006.01)
*C09D 133/14* (2006.01)
*C09D 133/08* (2006.01)

(52) U.S. Cl.
CPC .......... *C09D 5/028* (2013.01); *C09D 133/06* (2013.01); *C09D 133/08* (2013.01); *C09D 133/14* (2013.01)

(58) Field of Classification Search
CPC ......... C09D 5/028; C09D 133/08; C08K 3/34
See application file for complete search history.

(56) References Cited

U.S. PATENT DOCUMENTS

| | | |
|---|---|---|
| 3,037,006 A | 5/1962 | Hankins et al. |
| 3,037,969 A | 6/1962 | Hankins et al. |
| 3,497,485 A | 2/1970 | Emmons |
| 3,502,627 A | 3/1970 | Dupont |
| 4,119,600 A | 10/1978 | Bakule et al. |
| 5,527,853 A | 6/1996 | Landy et al. |
| 6,013,721 A | 1/2000 | Schall et al. |
| 6,376,574 B1 | 4/2002 | Helmer et al. |
| 6,531,538 B1 | 3/2003 | Weitzel et al. |
| 6,593,408 B1 | 7/2003 | Takaki et al. |
| 7,342,065 B2 | 3/2008 | Yang et al. |
| 7,511,090 B2 | 3/2009 | Wiese et al. |
| 9,249,316 B2 | 2/2016 | Schwarte et al. |
| 2002/0055580 A1 | 5/2002 | Lorah et al. |
| 2005/0059765 A1 | 3/2005 | Finch et al. |
| 2007/0015853 A1 | 1/2007 | Weng et al. |
| 2007/0208124 A1 | 9/2007 | Schiraldi et al. |
| 2008/0132632 A1 | 6/2008 | Schiraldi et al. |
| 2010/0152351 A1 | 6/2010 | Li |
| 2010/0166967 A1* | 7/2010 | Fasano .................. C09D 5/028 427/385.5 |

FOREIGN PATENT DOCUMENTS

| | | |
|---|---|---|
| CA | 23622949 A1 | 8/2000 |
| CN | 100591735 C | 2/2010 |
| CN | 101712730 A | 5/2010 |
| CN | 104845478 A | 8/2015 |
| DE | 69017916 T2 | 7/1995 |
| EP | 322188 A1 | 6/1989 |
| EP | 0409459 A2 | 1/1991 |
| EP | 0594321 A1 | 4/1994 |
| EP | 0811663 A2 | 12/1997 |
| WO | 2007058869 A2 | 5/2007 |
| WO | 2009015453 A2 | 2/2009 |

OTHER PUBLICATIONS

CN 1168400 machine translation. (Year: 1997).*
Chinese Search Report for the corresponding Chinese Application No. 2015800831243; Date of Filing: Mar. 15, 2018; 2 pages.

* cited by examiner

Primary Examiner — Edward J Cain
(74) Attorney, Agent, or Firm — Karl E. Stauss; Cantor Colburn LLP

(57) ABSTRACT

A shelf-stable aqueous binder composition, a process of preparing the binder composition, and a coating composition comprising the binder composition and having fast drying properties and developing good early resistance to water washout.

16 Claims, 1 Drawing Sheet

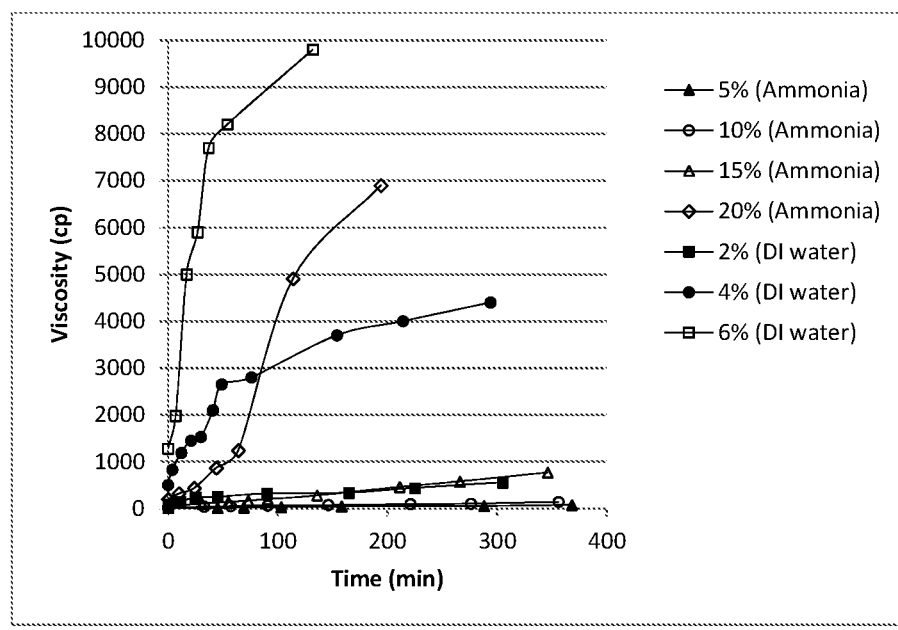
Viscosities of phyllosilicate suspensions in water or ammonia solution at different concentration versus storage time

SHELF-STABLE AQUEOUS COMPOSITION AND PROCESS OF MAKING THE SAME

FIELD OF THE INVENTION

The present invention relates to a shelf-stable aqueous coating composition and a process of making the same.

INTRODUCTION

Traffic paints (e.g., road-marking paints) have traditionally been formulated as solvent borne systems. Due to environmental concerns, various attempts to produce an aqueous road-marking paint as a substitute for solvent borne systems have been disclosed. However, a primary drawback with such aqueous paints has been that the aqueous paints do not dry quickly enough. Such aqueous coating compositions also tend to be less water resistant than solvent borne paints.

U.S. Pat. No. 5,527,853A discloses aqueous coating compositions which dry quickly and develop water resistance soon after application, wherein the composition contains an anionically stabilized emulsion polymer having a glass transition temperature ($T_g$) greater than about 0° C., a polyfunctional amine polymer, and a volatile base to raise the pH of the composition so that the amine groups are essentially in a non-ionized state. There remains a need to further improve other properties such as early water washout resistance. The early water resistance of coating compositions can be further improved by, for example, using emulsion polymers with more hydrophobicity and/or smaller particle size, which may compromise the shelf stability of the coating composition.

Therefore, it is desirable to provide a shelf-stable aqueous binder composition suitable for a coating composition, particularly suitable for traffic paints, that has fast dry characteristics and quickly develops good water resistance.

SUMMARY OF THE INVENTION

The present invention relates to a novel shelf-stable aqueous composition, particularly suitable for traffic paints, prepared by admixing an aqueous anionically stabilized polymer dispersion, a water soluble polyfunctional amine polymer, phyllosilicate, and a volatile base, wherein the phyllosilicate is first dispersed in the volatile base to form a suspension or dispersion prior to admixing with the anionically stabilized polymer and/or the water soluble polyfunctional amine polymer. The shelf-stable aqueous composition (also referred to as "binder composition") is suitable as a binder. The shelf-stable aqueous composition has good shelf stability, for example, at least 3 months when storage at room temperature (23±2° C.), while providing coatings made therefrom with good early water washout resistance, for example, an early water washout time of at least 5 minutes.

In a first aspect, the present invention is a shelf-stable aqueous composition comprising:
(a) an aqueous dispersion of an anionically stabilized polymer,
(b) a water soluble polyfunctional amine polymer, and
(c) a suspension or dispersion of a phyllosilicate in a volatile base, wherein the concentration of the phyllosilicate is from 1% to 18% by weight, based on the total weight of the suspension or dispersion, and
wherein the volatile base is used in an amount such that the composition has a pH wherein substantially all the polyfunctional amine polymer is in a non-ionic state.

In a second aspect, the present invention is a process of preparing a shelf-stable aqueous composition of the first aspect. The process comprises admixing:
(a) an aqueous dispersion of an anionically stabilized polymer,
(b) a water soluble polyfunctional amine polymer, and
(c) a suspension or dispersion of a phyllosilicate in a volatile base, wherein the concentration of the phyllosilicate is from 1% to 18% by weight, based on the total weight of the suspension or dispersion, and
wherein the volatile base is used in an amount such that the composition has a pH wherein substantially all the polyfunctional amine polymer is in a non-ionic state.

In a third aspect, the present invention is a coating composition comprising a shelf-stable aqueous composition of the first aspect.

BRIEF DESCRIPTION OF THE DRAWINGS

FIG. 1 is viscosities of phyllosilicate suspensions in water or ammonia solution at different concentration versus storage time.

DETAILED DESCRIPTION OF THE INVENTION

The shelf-stable aqueous composition of the present invention comprises one or more aqueous dispersions of an anionically stabilized polymer (also referred to as "aqueous anionically stabilized polymer dispersions"). The polymer in the aqueous dispersion may be selected from an acrylic (co)polymer, such as an acrylic polymer and a styrene-acrylic copolymer; an acrylic modified polyurethane; or mixtures thereof. Preferably, the anionically stabilized polymer is an emulsion polymer. Also preferably, the anionically stabilized polymer is an acrylic (co)polymer, such as an acrylic polymer and a styrene-acrylic copolymer, and more preferably, a styrene-acrylic copolymer.

The acrylic (co)polymer herein refers to a polymer or copolymer comprising, as polymerized units, one or more acrylic or methacrylic monomers. "Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

The acrylic (co)polymer useful in the present invention may comprise, as polymerized units, one or more nonionic monoethylenically unsaturated monomers. "Nonionic monomers" herein refer to monomers that do not bear an ionic charge between pH=1-14. Examples of suitable nonionic monoethylenically unsaturated monomers include (meth)alkyl or alkenyl esters of (meth)acrylic acid, such as methyl(meth)acrylate, ethyl(meth)acrylate, butyl(meth)acrylate, 2-ethylhexyl(meth)acrylate, hydroxyethyl(meth)acrylate, hydroxypropyl(meth)acrylate, benzyl(meth)acrylate, lauryl(meth)acrylate, oleyl(meth)acrylate, palmityl(meth)acrylate, stearyl(meth)acrylate, nonyl(meth)acrylate, decyl(meth)acrylate and the like; (meth)acrylonitrile; acrylamide; or mixtures thereof. Preferably, butyl acrylate is used as the nonionic monoethylenically unsaturated monomer.

Other suitable nonionic monoethylenically unsaturated monomers may be further added, for example, styrene and substituted styrene such as .alpha.-methyl styrene, p-methyl styrene, t-butyl styrene, vinyltoluene; ethylene, propylene, 1-decene; or other vinyl monomers such as vinyl acetate, vinyl butyrate, vinyl versatate and other vinyl esters, or mixtures thereof. The nonionic monoethylenically unsaturated monomers may be present as polymerized units, by weight based on the solids weight of the acrylic (co)polymer, in an amount of from 60% to 99.9%, from 70% to 99.5%, or from 85% to 99%.

The acrylic (co)polymer useful in the present invention may further comprise one or more multiethylenically unsaturated monomers. Examples of suitable multiethylenically unsaturated monomers include butadiene, allyl(meth) acrylate, divinyl benzene, or mixtures thereof. The multiethylenically unsaturated monomers may be present, as polymerized units, in an amount of from 0 to 5%, from 0.1% to 3%, or from 0.5% to 1.5%, by weight based on the solids weight of the acrylic (co)polymer.

The acrylic (co)polymer useful in the present invention may comprise, as polymerized units, one or more monoethylenically unsaturated monomers containing acid-functionality.

The monoethylenically unsaturated monomers containing acid-functionality may include monomers containing at least one carboxylic acid group including, for example, acrylic acid; methacrylic acid; acryloxypropionic acid; (meth)acryloxypropionic acid; itaconic acid; aconitic acid; maleic acid or anhydride; fumaric acid; crotonic acid; monomethyl maleate; monomethyl fumarate; monobutyl fumarate; monomethyl itaconate; phosphorus acid monomers such as dihydrogen phosphate monomers including 2-phosphoethyl (meth)acrylate, vinyl phosphonic acid, and allyl phosphonic acid; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium vinyl sulfonate; sodium salt of allyl ether sulfonate; or mixtures thereof. The monoethylenically unsaturated monomers containing acid-functionality may be present as polymerized units, by weight based on the solids weight of the acrylic (co)polymer, in an amount of from 0.1% to 5%, preferably less than 3%, and more preferably less than 2%.

Preferably, the acrylic (co)polymer comprises as polymerized units, by weight based on the solids weight of the acrylic (co)polymer, from 60% to 99.9%, and preferably from 70% to 99.5%, of the (meth)alkyl or alkenyl esters of (meth)acrylic acid; from 0.1 to 5%, and preferably from 0.5% to 2%, of the monoethylenically unsaturated monomer containing acid-functionality; and from 0 to 40%, and preferably from 0 to 30%, of styrene, substituted styrene, or mixtures thereof.

Also preferably, the acrylic (co)polymer comprises as polymerized units, by weight based on the solids weight of the acrylic (co)polymer, from 15% to 85%, preferably from 20% to 80%, and more preferably from 30% to 50%, of styrene, substituted styrene, or mixtures thereof; from 15% to 85%, preferably from 20% to 80%, and more preferably from 70% to 50%, of the (meth)alkyl or alkenyl esters of (meth)acrylic acids such as butyl acetate; and from 0.1% to 5%, and preferably from 0.5% to 2%, of the monoethylenically unsaturated monomers containing acid-functionality.

The types and levels of the monomers described above, as polymerized units, may be chosen to provide the acrylic (co)polymer with a glass transition temperature ($T_g$) suitable for different applications. The $T_g$ of the acrylic (co)polymer may be in the range of from −10° C. to 70° C., from 5° C. to 60° C., or from 20° C. to 40° C. $T_g$ values used herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, w($M_1$) is the weight fraction of monomer $M_1$ in the copolymer, w($M_2$) is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers.

The anionically stabilized polymer useful in the present invention may have a particle size of from 50 to 500 nanometers (nm), from 100 to 300 nm, or from 150 to 250 nm. Surprisingly, the shelf-stable aqueous composition of the present invention is still stable even when the particle size of the anionically stabilized polymer is smaller than 110 nm.

The negative charge on the dispersed anionically stabilized polymer particles is obtained in any of several ways, for example, the use of anionic surfactants or dispersants as the stabilizer during the emulsion polymerization or added to the emulsion after polymerization. Nonionic surfactants may also be present in the latex during or after polymerization of these anionically stabilized latexes. Examples of suitable anionic surfactants and dispersants include the salts of fatty rosin and naphthenic acids, carboxylic polymers and copolymers of the appropriate hydrophile-lipophile balance; higher alkyl sulfates, such as sodium lauryl sulfate; alkyl aryl sulfonates, such as dodecylbenzene sulfonate, sodium or potassium isopropylbenzene sulfonates or isopropynaphthalene sulfonates; sulfosuccinates, such as sodium dioctylsulfosuccinate alkali metal higher alkyl sulfosuccinates, e.g. sodium octyl sulfosuccinate, sodium N-methyl-N-palmitoyltaurate, sodium oleyl isethionate, alkali metal salts of alkylarylpoly ethoxyethanol sulfates or sulfonates, e.g. sodium t-octylphenoxy-polyethoxyethyl sulfate having 1 to 5 oxyethylene units. Another type of negatively-charged latex may be obtained as a result of including in the polymers small amounts of acidic groups, which may be in the salt form, such as an alkali metal or ammonium salt. Examples of such acidic groups are those derived from incorporated initiator fragments and/or the above described monoethylenically unsaturated monomers containing acid-functionality.

The anionically stabilized polymer useful in the present invention may be prepared by polymerization techniques well known in the art, such as emulsion polymerization of the monomers described above. Total weight concentration of monomers for preparing the anionically stabilized polymer such as the acrylic (co)polymer is equal to 100%. Emulsion polymerization is discussed in detail in D. C. Blackley, Emulsion Polymerization (Wiley, 1975), or, alternatively, it is also discussed in H. Warson, The Applications of Synthetic Resin Emulsions, Chapter 2 (Ernest Berm Ltd., London 1972). Emulsion polymerization techniques for preparing the aqueous dispersion of the acrylic (co)polymer particles are well known in the polymer art, and include multiple stage polymerization processes. The emulsion polymerization may be conducted in the presence of a surfactant. These surfactants may include the anionic surfactants described above and/or nonionic emulsifiers. Examples of suitable nonionic emulsifiers include ethylenically unsaturated surfactant monomers, ethoxylated alcohols or phenol, or mixtures thereof. The amount of the surfactant used is usually 0.1% to 6% by weight, based on the total weight of monomers. Preferably, nonionic surfactants are used. Temperature suitable for emulsion polymerization processes may be lower than 100° C., in the range of from 30° C. to 95° C., or in the range of from 50° C. and 90° C. A mixture of the monomers may be added neat or as an emulsion in water. The monomer mixture may be added in one or more additions or continuously, linearly or nonlinearly, over the reaction period, or combinations thereof. The surfactant may be added prior to or during the polymerization of the monomers, or combinations thereof. A portion of the surfactant can also be added after the polymerization.

In the emulsion polymerization process, free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used in preparing the anionically stabilized polymer.

Redox systems comprising the above described initiators coupled with a suitable reductant may be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used. Chelating agents for the metals may optionally be used.

In the emulsion polymerization process, one or more chain transfer agents may also be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. When present, the concentration of the chain transfer agent may be, by weight based on the total weight of monomers, from 0.01% to 5%, from 0.05% to 3%, or from 0.1% to 2%.

After polymerization of the anionically stabilized polymer, the obtained polymer may be neutralized by using one or more bases as neutralizers. Examples of suitable bases include ammonia, ammonium bicarbonate; alkali metal or alkaline earth metal compounds such as sodium hydroxide, potassium hydroxide, calcium hydroxide, aluminum hydroxide; zinc oxide, magnesium oxide, sodium carbonate, sodium bicarbonate; metal chelate compounds of ammonia; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; or mixtures thereof.

The aqueous anionically stabilized polymer dispersion useful in the present invention may be present, by solids weight based on the total weight of the shelf-stable aqueous composition, in an amount of 60% or more, 75% or more, or even 80% or more, and at the same time, 98% or less, 90% or less, or even 85% or less.

The shelf-stable aqueous composition of the present invention further comprises (b) one or more water-soluble polyfunctional amine polymers. To prepare the shelf-stable aqueous composition, the polyfunctional amine polymer is maintained essentially in a nonionic state by adding a sufficient amount of volatile base to raise the pH of the composition at or near the point at which substantially all the amine functional groups are in a nonionic state (deprotonation) and therefore do not interact with the anionically stabilized latex.

The polyfunctional amine polymers useful in the present invention may include both the completely soluble and the partly soluble polymers. The term water-soluble polyfunctional amine polymer describes polymer that is completely soluble either in free-base, neutral, or salt form. Some polymers are soluble at all pH's, while others are soluble over a range of pH for example from about 5 to 10. Other amine-containing polymers are generally insoluble at high pH and soluble or partly soluble at acidic pH values, particularly in the pH range from about 5 to about 7. By partly soluble is meant both the situation in which some of the polymer is soluble in water as well as that in which the entire polymer dissolves in the form of micelles or aggregates of individual molecules, generally, highly water swollen aggregates. The latter are often called colloidal solutions. It is preferred that most of the polymer be soluble at the acidic pH values.

The polyfunctional amine polymer useful in the present invention may have from 20% to 100% by weight or at least 50% by weight of the monomer units containing an amine group, based on the weight of the polyfunctional amine polymer. The polyfunctional amine polymer may have no acid groups other than trace amounts.

The polyfunctional amine polymer useful in the present invention may comprise, as polymerized units, from 20% to 100% by weight, and preferably at least 50% by weight of amine-containing monomer of the total monomers used in preparing the polyfunctional amine polymer.

The amine-containing monomers useful in preparing the polyfunctional amine polymer may include aminoalkyl vinyl ethers or sulfides wherein the alkyl groups may be straight-chain or branched-chain type and have from two to three carbon atoms and wherein the nitrogen atom may be a primary, secondary, or tertiary nitrogen atom. The nitrogen atom may be a secondary nitrogen atom, and one of the remaining hydrogen atoms may be substituted by alkyl, hydroxyalkyl, or alkoxyalkyl groups, the alkyl components of which may have one to four carbon atoms, preferably two carbon atoms. Specific examples include beta-aminoethyl vinyl ether, beta-aminoethyl vinyl sulfide, N-monomethyl-beta-aminoethyl vinyl ether or sulfide, N-monoethyl-beta-aminoethyl vinyl ether or sulfide, N-monobutyl-beta-aminoethyl vinyl ether or sulfide, N-monomethyl-3-aminopropyl vinyl ether or sulfide, or mixtures thereof.

The amine-containing monomers useful in preparing the polyfunctional amine polymer may include an acrylamide or acrylic esters, such as those of formula (I):

wherein R is H or CH$_3$; n is 0 or 1; X is O or N(H); when n is zero, A is O(CH$_2$)x wherein x is 2 to 3, or (O-alkylene)y wherein (O-alkylene)y is a poly(oxyalkylene)group, having a molecular weight in the range from 88 to 348, in which the individual alkylene radicals are the same or different and are either ethylene or propylene; and when n is 1, A is an alkylene group having 2 to 4 carbon atoms; R* is H, methyl, or ethyl; and R$^0$ is H, phenyl, benzyl, methylbenzyl, cyclohexyl, or (C$_1$-C$_6$)alkyl.

Examples of compounds of formula (I) include dimethylaminoethylacrylate or methacrylate; beta-aminoethyl acrylate or methacrylate; N-beta-aminoethyl acrylamide or methacrylamide; N-(monomethylaminoethyl)-acrylamide or methacrylamide; N-(mono-n-butyl)-4-aminobutyl acrylate or methacrylate; methacryloxyethoxy ethylamine; acryloxypropoxypropoxypropylamine; and mixtures thereof.

The amine-containing monomers useful in preparing the polyfunctional amine polymer may include N-acryloxyalkyl-oxazolidines and N-acryloxyalkyltetrahydro-1,3-oxazines and the corresponding components in which the "alkyl" linkage is replaced by alkoxyalkyl and poly(alkoxyalkyl), all of which are embraced by formula (II):

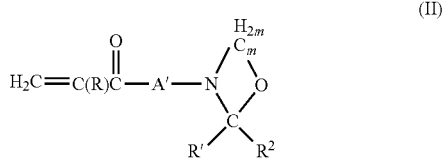

wherein R is H or CH$_3$; m is an integer having a value of 2 to 3;

R', when not directly joined to R$^2$, is selected from the group consisting of hydrogen, phenyl, benzyl, and (C$_1$-C$_{12}$) alkyl groups; R$^2$, when not directly joined to R', is selected from the group consisting of hydrogen and (C$_1$-C$_4$) alkyl groups; R' and R$^2$, when directly joined together, form a 5- to 6-carbon ring with the attached carbon atom of the ring in the formula, i.e., R' and R$^2$, when joined together, are selected from the group consisting of pentamethylene and tetramethylene; and A' is O(C$_m$H$_{2m}$)— or (O-alkylene)$_n$ in which (O-alkylene)$_n$ is a poly(oxyalkylene) group, having a molecular weight in the range from 88 to 348, in which the individual alkylene radicals are the same or different and are either ethylene or propylene.

The compounds of formula (II) can hydrolyze under various conditions to secondary amines. The hydrolysis produces products having the structure of formula (III):

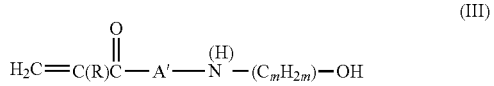

The compounds of formula (II) are disclosed in U.S. Pat. Nos. 3,037,006 and 3,502,627 may be used in making the polyfunctional amine polymers to be used in the shelf-stable aqueous composition of the present invention.

Examples of compounds of formula (II) include oxazolidinylethyl methacrylate; oxazolidinylethyl acrylate; 3-(gamma-methacryloxypropyl)-tetrahydro-1,3-oxazine; 3-(beta-methacryloxyethyl)-2,2-pentamethylene oxazolidine; 3-(beta-methacryloxyethyl-2-methyl-2-propyloxazolidine; N-2-(2-acryloxyethoxy)ethyloxazolidine; N-2-(2-ethacryloxyethoxy)ethyl-oxazolidine; N-2-(2-methacryloxyethoxy)ethyl-5-methyl-oxazolidine; N-2-(2-acryloxyethoxy)ethyl-5-methyl-oxazolidine; 3-[2-(2-methacryloxyethoxy) ethyl)]-2,2 penta-methylene-oxazolidine; 3-[2-(2-methacryloxyethoxy) ethyl)]-2,2-dimethyloxazolidine; 3-[2-(methacryloxyethoxy)ethyl]-2-phenyl-oxazolidine; or mixtures thereof.

The amine-containing monomers useful in preparing the polyfunctional amine polymer may include monomers which readily generate amines by hydrolysis. Examples of such monomers are acryloxy-ketimines and -aldimines, such as those of formulae (IV) and (V):

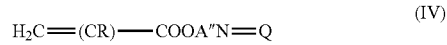

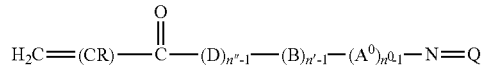

wherein R is H or CH$_3$; A" is a (C$_1$-C$_{12}$) alkylene group; A$^\circ$, B and D are the same or different oxyalkylene groups having the formula —OCH(R$^7$)—CH(R$^7$)—, wherein R$^7$ is H, CH$_3$, or C$_2$H$_5$; n$^\circ$ is an integer of 1 to 200; n' is an integer of 1 to 200; n" is an integer of 1 to 200; and the sum of n$^\circ$-1, n'-1 and n"-1 having a value of 2 to 200; and Q is selected from the group consisting of

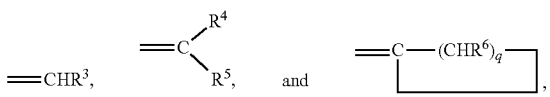

wherein R$^3$ is selected from the group consisting of phenyl, halophenyl, (C$_1$-C$_{12}$) alkyl, cyclohexyl, and (C$_1$-C$_4$) alkoxyphenyl groups; R$^4$ is selected from the group consisting of (C$_1$-C$_{12}$) alkyl and cyclohexyl; R$^5$ is selected from the group consisting of (C$_1$-C$_{12}$) alkyl and cyclohexyl groups; R$^6$ is H or methyl in one CHR$^6$ unit; and q is 4 or 5.

Examples of compounds of formulae (IV) and (V) include 2-[4-(2,6-dimethylheptylidene)-amino]-ethyl methacrylate; 3-[2-(4-methylpentylidine)-amino]-propyl methacrylate; beta-(benZylideneamino)-ethyl methacrylate; 3-[2-(4-methylpentylidene)-amino]-ethyl methacrylate; 2-[4-(2,6-dimethylheptylidene)-amino]-ethyl acrylate; 12-(cyclopentylidene-amino)-dodecyl methacrylate; N-(1,3-dimethylbutylidene)-2-(2-methacryloxyethoxy) ethylamine; N-(benzylidene)-methacryloxyethoxyethylamine; N-(1,3-dimethylbutylidene)-2-(2-acryloxyethoxy) ethylamine; N-(benzylidene)-2-(2-acryloxyethoxy)ethylamine; or mixtures thereof.

The compounds of formulae (IV) and (V) hydrolyze in acid, neutral, or alkaline aqueous media to produce the corresponding primary amines or salts thereof in which the group —N=Q of the formulae becomes —NH$_2$ and O=Q. The compounds of formulae (IV) and (V) are disclosed in U.S. Pat. Nos. 3,037,969 and 3,497,485, and any of the monomeric compounds therein disclosed may be used in making the polyfunctional amine polymer.

Preferred polyfunctional amine polymer is polyoxazolidinoethylmethacrylate. The polyfunctional amine polymer useful in the present invention may be present, by solids weight based on the solids weight of the aqueous dispersion of anionically stabilized polymer, in an amount of 0.1% or more, 0.5% or more, or even 1.0% or more, and at the same time, 4% or less, 3% or less, or even 2% or less.

The polyfunctional amine polymer useful in the present invention may be prepared by solution polymerization of the amine-containing monomers described above in aqueous media, either neutral, alkaline or acidic, depending upon the particular polyfunctional amine polymer sought, as generally known in the art, for example, in accordance with the method taught in U.S. Pat. No. 4,119,600. Generally, the polymerization is carried out in an aqueous medium containing a small amount of an acid, either organic or inorganic, such as acetic acid or hydrochloric acid.

The shelf-stable aqueous composition of the present invention further comprises (c) a suspension or dispersion of a phyllosilicate dispersed in a volatile base ("phyllosilicate suspension or dispersion"). The phyllosilicate useful in the present invention may be a sodium magnesium silicate. The phyllosilicate can also be a sodium lithium magnesium silicate. Preferred phyllosilicate is laponite. Laponite is a sodium magnesium mixed silicates also possibly containing lithium, which has a plate shaped layer structure that may have a central octahedral sheet sandwiched between two tetrahedral microscopic crystal sheets. Preferably, the laponite used in the present invention is a sodium lithium magnesium silicate. Laponite is the synthetic form of the natural mineral known as hectorite. Laponite, the synthetic origin of this family of silicates, is more preferably than the natural form, since laponite has a particle size much smaller than that of the natural minerals hectorite. Examples of commercially available laponites include LAPONITE™ XLS, LAPONITE XLG, LAPONITE RD and LAPONITE RDS all available from BYK Additives & Instruments; and more preferably LAPONITE XLG.

The particle size of the phyllosilicate useful in the present invention may be 10 nm or bigger, 15 nm or bigger, or even 25 nm or bigger, and at the same time, 500 nm or smaller, 100 nm or smaller, or even 40 nm or smaller The concentration of the phyllosilicate in the phyllosilicate suspension or dispersion may be, by weight based on the total weight of the phyllosilicate suspension or dispersion, 1% or more, 5% or more, 8% or more, or even 9% or more, and at the same time, 18% or less, 17% or less, 16% or less, or even 15% or less.

The phyllosilicate useful in the present invention needs to be dispersed in a volatile base prior to mixing with the anionically stabilized polymer, preferably the anionically stabilized emulsion polymer, and/or the waterborne polyfunctional amine polymer to form the shelf-stable aqueous composition of the present invention. "Volatile base" refers to a base having a boiling point less than 100° C. at standard pressure (1 atm or 760 mm/Hg). The phyllosilicate dispersed in the volatile base may form a suspension or dispersion. Examples of suitable volatile bases useful in the present invention include ammonia solution;

morpholine; lower alkyl amines, such as $C_1$-$C_5$ alkyl amines; 2-dimethylaminoethanol; N-methylmorpholine; ethylenediamine; or mixture thereof. The volatile base is usually in the form of a water solution of volatile base. Preferred volatile base is ammonia solution. The concentration of the volatile base in the suspension or dispersion may be, by weight based on the total weight of the suspension or dispersion, 5% or more, 10% or more, or even 15% or more, and at the same time, 30% or less, 25% or less, or even 20% or less.

The phyllosilicate suspension or dispersion may optionally further comprise from 0 to 3% or from 0.1% to 1% of one or more nonvolatile bases, by weight based on the total weight of the suspension or dispersion. "Nonvolatile bases" herein refer to bases having a boiling point higher than 100° C. at standard pressure (1 atm or 760 mm/Hg). Examples of suitable nonvolatile bases include sodium hydroxide, potassium hydroxide, zinc oxide, mono-ethanolamine, triethyl amine, diethyl amine, dimethyl amine, aluminum hydroxide, 2-amino-2-methyl-1-propanol, or combinations thereof. In addition to the phyllosilicate, the volatile base and optionally the nonvolatile base, the rest of the phyllosilicate suspension or dispersion may be water. The phyllosilicate suspension or dispersion may be prepared by mixing the phyllosilicate with the volatile base and optionally the nonvolatile base and water, preferably with stirring. The mixing may be conducted at a temperature of from 30° C. to 80° C., from 40° C. to 70° C., or from 40° C. to 60° C.

The phyllosilicate suspension or dispersion in the shelf-stable aqueous composition may be present, by solids weight based on the weight of the aqueous anionically stabilized polymer dispersion, in an amount of 0.1% or more, 0.2% or more, or even 0.3% or more, and at the same time, 1% or less, 0.8% or less, or even 0.6% or less.

The volatile base in the shelf-stable aqueous composition may all result from the volatile base added through the phyllosilicate suspension or dispersion. Alternatively, in addition to the volatile base included by addition of the phyllosilicate suspension or dispersion, the shelf-stable aqueous composition may also comprise volatile vase directly added into the composition. Total amount of volatile base should be sufficient to raise a pH of the aqueous composition wherein substantially all the polyfunctional amine polymer is in a non-ionic state. For example, the shelf-stable aqueous composition of the present invention may have a pH of 9.5 to 14 or from 10 to 11. The total amount of the volatile base required to reach the above pH can be calculated from the number of equivalents of base needed to neutralize all of the acid groups in the latex (i.e. acid groups from: copolymerized carboxylic-bearing monomer; surfactant; or initiator) and the conjugate acid of the amine base. One equivalent of volatile base (based on latex acids and polyamine titers) is usually enough to yield a stable system although higher levels of volatile base (~3 to 4 equivalents) may be necessary for long term stability. Higher amounts of volatile base can be used without departing from the spirit of the invention although the "quick dry" (fast-dry) properties of the coating may be reduced. If the polyfunctional amine polymer is not sufficiently deprotonated, the aqueous composition of the present invention will exhibit observable signs of instability over time, such as viscosity increase and microscopically observable particle rafting, an early stage of aggregation/gellation.

In addition to the shelf-stable property, the shelf-stable aqueous of the present invention can also provide a high solids content, for example, 35% or higher, 40% or higher, or even 45% or higher, and at the same time, 65% or lower, 60% or lower, or even 55% or lower, by weight based on the weight of the shelf-stable aqueous composition.

The present invention also provides a method of preparing the shelf-stable aqueous comprising: admixing the aqueous anionically stabilized polymer dispersion, the phyllosilicate suspension or dispersion, and the waterborne polyfunctional amine polymer described above. The phyllosilicate to be included in the aqueous composition should be in the form of a suspension or dispersion in a volatile base, by dispersing the phyllosilicate in the volatile base, so as to ensure the composition of the present invention has good shelf-stability. The phyllosilicate suspension or dispersion may be mixed with the anionically stabilized polymer and the polyfunctional amine polymer in any order to provide the shelf-stable aqueous of the present invention. Preferably, after the polymerization of the anionically stabilized polymer is completed, the phyllosilicate suspension or dispersion and the aqueous anionically stabilized polymer dispersion are first mixed, and then further mixed with the waterborne polyfunctional amine polymer. Mixing the phyllosilicate suspension or dispersion with the anionically stabilize polymer dispersion and/or the polyfunctional amine polymer may be conducted at temperatures ranging from 30 to 80° C., from 40 to 70° C., or from 40 to 60° C.

The shelf-stable aqueous composition of the present invention has good shelf-stability. The term "good shelf-stability" means that the composition, when filled into a 250 mL, 20 cm high measuring cylinder and stored at room temperature for at least 3 months, shows no layering or sedimentation visible to the naked eye, and has solids difference between top layer (within 5 centimeters (cm) to the surface) and bottom layer (within 5 cm to the bottom) less than 1.0% by weight. The shelf-stable aqueous composition may have a shelf-stability of at least 4 months, at least 9 months, or at least 12 months at room temperature. The shelf-stability property is measured according to the test method described in the Example section.

The present invention also provides a method of improving the shelf-stability of a conventional binder composition comprising (a) the anionically stabilized polymer dispersion and (b) the water soluble polyfunctional amine polymer. The method comprises: providing the suspension or dispersion of phyllosilicate in a volatile base, and admixing the phyllosilicate suspension or dispersion with the anionically stabilized polymer dispersion and the water soluble polyfunctional amine polymer. Surprisingly, the method can be used in improving the shelf-stability of a binder composition comprising the styrene-acrylic copolymer. The phyllosilicate suspension or dispersion is post added into the composition, that is, the addition is carried out after completing the polymerization of monomers used for preparing the anionically stabilized polymer. The aqueous composition obtained by the method of the present invention has good stability as described above. Preferably, the phyllosilicate suspension or dispersion is mixed with the anionically stabilized polymer dispersion prior to mixing with the polyfunctional amine polymer.

The present invention also provides a coating composition comprising the shelf-stable aqueous composition of the present invention. The coating composition may further comprise pigments. "Pigments" herein refer to materials that can provide whiteness and color including inorganic pigments and organic pigments. Inorganic pigments typically include metal oxides. Examples of suitable metal oxides include titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. Suitable commercially available $TiO_2$ include, for example, KRONOS™ 2310 available from Kronos Worldwide, Inc., Ti-Pure™ R-706 available from DuPont (Wilmington, Del.), TiONA™ AT1 available from Millenium Inorganic Chemicals, or mixtures thereof. $TiO_2$ may be also available in concentrated dispersion form. Organic pigments typically refer to opaque polymers such as ROPAQUE™ Ultra E available from The Dow Chemical Company (ROPAQUE is a trademark of The Dow Chemical Company). When the pigment comprises $TiO_2$, the concentration of $TiO_2$ may be in an amount of 10% or less, 5% or less, or even 3% or less, by weight based on the total weight of the coating composition.

The coating composition of the present invention may further comprise fillers. Examples of suitable fillers include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, or mixtures thereof.

As the shelf-stable aqueous composition of the present invention has a high solids content, the coating composition comprising thereof can have a high volume solids (VS), for example, 45% or higher, 55% or higher, or even 60% or higher. The VS herein is calculated by total dry volume of paint (that is, the sum of volume of pigments, volume of extenders, volume of fillers and volume of binder) divided by total wet volume of paint (that is, total dry volume of paint plus volume of water). The coating composition of the present invention can have a high pigment volume concentration (PVC), for example, 40% or higher, 50% or higher, or even 60% or higher. The PVC herein is calculated by the following equation:

$$PVC(\%) = \frac{Volume_{pigment(s)} + Volume_{extebder(s)} + Volume_{filler(s)}}{Dry\ Volume_{paint}} \times 100$$

The coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from TEGO, BYK-024 silicone deformer available from BYK, or mixtures thereof. When present, the concentration of the defoamer may be, by weight based on the total weight of the coating composition, from 0.01% to 1%, from 0.05% to 0.8%, or from 0.1% to 0.5%.

The coating composition of the present invention may further comprise one or more thickeners, also known as "rheology modifiers". The thickeners may include polyvinyl alcohol, clay materials, acid derivatives, acid copolymers, urethane associate thickeners, polyether urea polyurethanes, polyether polyurethanes, or mixtures thereof. Examples of suitable thickeners include alkali swellable emulsions (ASE); hydrophobically modified alkali swellable emulsions (HASE); associative thickeners such as hydrophobically modified ethoxylated urethanes (HEUR); and cellulosic thickeners such as methyl cellulose ethers, hydroxymethyl cellulose, hydroxyethyl cellulose, hydrophobically-modified hydroxy ethyl cellulose, 2-hydroxypropyl methyl cellulose, 2-hydroxyethyl methyl cellulose, 2-hydroxybutyl methyl cellulose, and 2-hydroxyethyl ethyl cellulose. Preferably, the thickener is hydroxyethyl cellulose. The thickener may be present, by weight based on the total solids weight of the composition, in an amount of from 0 to 3%, from 0.1% to 2%, or from 0.3% to 1%.

The coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The coalescent may be present, by weight based on the total solids weight of the coating composition, in an amount of from 0 to 10%, from 0.1% to 8%, or from 1% to 5%.

The coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK™-346 and BYK-349 polyether-modified siloxanes both available from BYK, or mixtures thereof. The concentration of the wetting agent may be, by weight based on the total weight of the coating composition, from 0 to 2.5%, from 0.1% to 2%, or from 0.5% to 1%.

In addition to the components described above, the coating composition of the present invention may further comprise any one or combination of the following additives: buffers, dispersants, humectants, mildewcides, biocides, anti-skinning agents, colorants, flowing agents, anti-oxidants, plasticizers, leveling agents, dyes, crosslinking agents, adhesion promoters, tackifiers, preservatives, antifreeze agents, freeze/thaw protectors, slip additives, waxes, corrosion inhibitors, anti-flocculants, and grind vehicles. These additives may be present in a combined amount of from 0 to 5% or from 0.01% to 2%, by weight based on the total solids weight of the coating composition.

The present invention also provides a method of preparing the coating composition described above, comprising: admixing the shelf-stable aqueous composition with other optional components to form the coating composition. Any of the above-mentioned optional components may be added to the composition during or prior to the mixing to form the coating composition of the present invention.

The coating composition of the present invention dries fast, that is, being a fast-drying composition. The term "fast-drying composition" means that, when applied to a substrate at a wet thickness of about 400 microns, displays a dry-through time less than 45 minutes at 50% relative humidity (RH) and at room temperature (23±2° C.).

The coating composition of the present invention develops early resistance to water washout. A coating (i.e. a coating film) obtained from the coating composition, has good early water washout resistance, for example, having an early washout time of at least 5 minutes, at least 8 minutes, or at least 10 minutes, when the coating composition is applied to a substrate to form a coating film having a wet thickness of about 400 microns and then dries at 50% RH and at room temperature for 30 minutes, as measured according to the test method described in the Example section below.

The coating composition of the present invention can be applied to a substrate by incumbent means including brushing, dipping, rolling and spraying. The composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition has been applied to a substrate, the coating composition may be dried, or be allowed to dry, at room temperature, or at an elevated temperature, for example, from 35° C. to 60° C. to form a coating.

The coating composition of the present invention can be applied to, and adhered to, various substrates. Examples of suitable substrates include wood, metals, plastics, foams, stones, elastomeric substrates, glass, fabrics, concrete, cementious substrates, or pre-coated substrates. The coating composition is suitable for various coating applications, such as marine and protective coatings, automotive coatings, wood coatings, general metal coatings, coil coatings, roof coatings, plastic coatings, powder coatings, can coatings, traffic paints, maintenance coatings, and civil engineering coatings.

The present invention also provides a method of producing a coating on an exterior surface, comprising: applying on the surface the coating composition of the present invention, and drying, or allowing to dry, the coating composition to produce the coating. The method of producing a coating may further include evaporating the volatile base from the coating composition after applying the composition on the substrate. The obtained exterior coating may be maintenance coatings, house paint coatings, road marking and pavement marking on a surface, or a water resistant marking on a road or pavement surface such as a traffic marking on a road or pavement surface. The fast drying nature of the coating composition of the present invention makes them particularly useful as traffic paints and as maintenance coatings for substrates where quick development of water-resistance is desirable. The coating composition of the present invention can be used alone, or in combination with other coatings to form multi-layer coatings.

Examples

Some embodiments of the invention will now be described in the following Examples, wherein all parts and percentages are by weight unless otherwise specified. The following materials are used in the examples:

Methacrylic acid ("MAA"), methyl methacrylate ("MMA"), ammonium persulphate ("APS"), butyl acrylate ("BA"), and n-dodecyl mercaptan (n-DDM) are all available from Sinoreagent Group.

FASTRACK™ 3427 ("FT 3427") is a pure acrylic binder for traffic paint application available from The Dow Chemical Company (FAS TRACK is a trademark of The Dow Chemical Company).

HZ-200 synthetic phyllosilicate clay, available from Jiangsu Provice Sihong County Ebizal Fine Chemical Co., Ltd., is magnesium lithium silicate.

OROTAN™ 901 dispersant, available from The Dow Chemical Company, is polyacid and used as a pigment dispersant (OROTAN is a trademark of The Dow Chemical Company).

NOPCO™ NXZ, available from The San Nopco, is a mineral oil and used as a defoamer.

TRITON™ CF-10, available from The Dow Chemical Company, is a nonionic surfactant (TRITON is a trademark of The Dow Chemical Company).

TRITON X-405, available from The Dow Chemical Company, is octylphenol ethoxylate and used as a non-ionic surfactant.

Ti-PURE™ R-902, available from DuPont, is titanium dioxide and used as a pigment.

CC-500, available from Zhengfa Company, is $CaCO_3$ and used as a filler.

Ethanol, available from Sinopharm, is used as a coalescent.

TEXANOL™ ester alcohol, available from Eastman Chemical Company, is 2,2,4-Trimethyl-1,3-pentanediol monoisobutyrate and used as a coalescent.

Ammonia solution (28%), available from Sinopharm, is used as a neutralizer.

NATROSOL™ 250 HBR, available from Ashland Inc., is hydroxyethylcellulose (HEC), a nonionic water-soluble polymer derived from cellulose.

Diatomaceous, available from Zhengfa Company, is a natural silicate.

The following standard analytical equipment and methods are used in the Examples.

Overnight Krebs Units (KU) Viscosity

A coating composition is filled into a 200 mL cylindrical jar with radius 5 cm and then left at room temperature for 20 hours. Then the overnight KU viscosity is measured using a Stormer viscometer.

Brookfield Viscosity

Brookfield (BF) viscosity is determined by a Brookfield Viscosity Meter DV II+ Pro (60 rpm, #2 spindle) at room temperature according to ASTM D 562-2001 standard.

Shelf Stability

A 250 mL, 20 cm high transparent measuring cylinder is filled with an aqueous composition to be tested and then stored at room temperature. The composition is observed by visual inspection and solids contents of top layer and bottom layer of the composition, respectively, are measured at regular intervals. The top layer herein refers to the layer within 5 cm to the top of the cylinder (that is, the surface of the composition). The bottom layer herein refers to the layer within 5 cm to the bottom of the cylinder. Shelf stability is determined as the time period where the aqueous composition shows no visible layering or sedimentation, and the solids difference between the top layer and the bottom layer is up to 1% by weight.

Konig Pendulum Hardness

Konig pendulum hardness is measured according to the ASTM D4366 method.

Dry-to-No-Pickup Time

This test method is derived from the ASTM D711-89 method. The equipment (15 Kg) used in the test consists of a steel cylinder, fitted with 2 replaceable O-rings of synthetic rubber. A coating composition to be tested is applied to a thin polyvinyl chloride (PVC) slide at a wet film thickness of 400 μm using a mechanical spreader. The starting point of the dry-to-no-pickup time is recorded as the point in time where the coating composition is applied on the PVC slide. The test panels are then promptly placed in a test chamber in a horizontal position at 50% RH and at room temperature. Then the test panels are removed from the test chamber at 2 minute intervals to evaluate the dry-to-no-pickup time by rolling a traffic paint drying wheel over the wet film. The end point for dry-to-no-pickup time is defined as the point in time where no paint adheres to the rubber rings of the test wheel.

Dry-Through Time

This test method for measuring dry-through time is derived from the ASTM D 1640-95 method. Coating compositions are drawn down on clean glass panels at a wet thickness of 400 μm. The coated panels are immediately placed in a test chamber (Victor, Associates. Inc. Ivyland. Pa.) maintained at room temperature and at 50% RH and 89% RH, respectively. The coated glass panels are removed from the chamber at 5 minute intervals for 50% RH tests or at 10 minute intervals for 89% RH tests. Dry-through time is defined as the time it takes for a wet coating to reach a state such that the coating is not distorted by a 90° thumb twist, when the thumb is placed on the coating film with pressure applied.

Dirt Pick-Up Resistance (DPUR)

DPUR is measured according to the GB T-9870-2005 method (stain: iron oxide red, detergent: 1% TRITON X-405 solution, abrasion cycles: 20 cycles).

Early Water Washout Time

A coating composition is applied to a clean glass substrate by a 400 μm applicator to form coating films with a wet thickness of 400 μm. The test panels then dry at 25° C. and at 50% RH for 30 minutes. The obtained panels are then placed under a stream of running water, such that water contacts the surface of the coating films at a perpendicular angle. The early water washout time is defined as the time it takes for the test panels to show a break in the coating films or any film removal under running water by visual inspection.

Preparation of Polyfunctional Amine Polymer QR-1188 (Used as a Quick-Set Additive)

To a 2-liter reactor containing 600 grams (g) of deionized (DI) water under a nitrogen atmosphere at 60° C., 2.8 g of an aqueous solution of ferrous sulfate heptahydrate (0.15%) and 0.8 g of an aqueous solution of the tetrasodium salt of ethylenediamine tetraacetic acid (1%) diluted with 10 g DI water were added with stirring. A feed composed of 200 g 2-(3-oxazolidinyl)ethyl methacrylate (OXEMA) and 100 g DI water was added over a period of 2 hours. Simultaneously, feeds composed of 2 g t-butylhydroperoxide (70% active) dissolved in 23 g DI water and 2 g sodium sulfoxylate formaldehyde dihydrate dissolved in 23 g DI water were added over a period of 2 hours. After completion of the feeds, the reaction was held at 60° C. for 30 minutes, then 0.16 g of t-butylhydroperoxide (70% active) dissolved in 10 DI water was added. Fifteen minutes later, 0.1 g of t-butylhydroperoxide (70% active) dissolved in 10 g DI water, and 0.06 g sodium sulfoxylate formaldehyde dihydrate dissolved in 10 g DI water were added. Fifteen minutes later, the reaction was cooled to room temperature. The polyfunctional amine polymer had a pH of 8.2, a solids content of 17.6% and a Brookfield viscosity (spindle 2 at 60 rpm) of 30 cps.

Preparation of BZ0587 Latex Binder

Monomer mixture used for preparing the binder was prepared as following: To 212.3 g DI water, was added 8.44 g Rhodapex CO-436 nonylphenol ethoxylates ammonium salt surfactant (Solvay Chemicals) (61%), 401 g styrene, 438.65 g BA, 26.16 g MAA, 2.03 g SILQUEST™ A-171 vinyltrimethoxysilane (Momentive Specialty Chemicals), and 0.66 g n-DDM were mixed together to produce a stable monomer emulsion mixture.

To 502.3 g of DI water under a nitrogen atmosphere at 90° C., was added 5.57 g Rhodapex CO-436 Surfactant (61%), 3.64 g of ammonium (25%) in 33.06 g DI water, 2.43 g ammonium bicarbonate dissolved in 30.15 g DI water, 47.37 g monomer mixture obtained above and 2.54 g APS dissolved in 11.78 g DI water followed by 4.72 g DI water to form a reaction mixture. The remaining monomer mixture was then added at 89° C. over 90 minutes (min) followed by 20.61 g DI water. At the end of polymerization, a mixture of 0.0087 g $FeSO_4$ dissolved in 4.35 g DI water and 0.089 g ethylenediamine tetraacetic acid dissolved in 2.34 g DI water was added at 85° C. Then a solution of 1.22 g t-butyl hydroperoxide dissolved in 9.36 g DI water was added. Next, a solution of 0.87 g isoascorbic acid dissolved in 16.5 g DI water was added over 15 min and held for 10 min. At 65-75° C., 4.37 g MMA and 4.71 DI water followed by a solution of 0.76 g t-butyl hydroperoxide dissolved in 9.43 g DI water were further added. Finally, a solution of 0.53 g isoascorbic acid dissolved in 9.43 g DI water were added at 60° C. to obtain the BZ0587 latex binder. The obtained latex binder had the following properties: $T_g$: around 35° C., pH: 6.04, solids content: 50.67%, average particle size: 102 nm, viscosity: 1,406 centipoises (cps).

Preparation of BX17-20 Latex Binder

The BX17-20 latex was prepared according to the same procedure as preparation of the BZ0587 latex binder above, except that the monomer emulsion mixture used was prepared as follows:

357.6 g DI water, 44.28 g Disponil Fes-32 (30%), 870.33 g MMA, 625.36 g BA, 25.87 g MAA and 19.02 g n-DDM were mix together to produce a stable monomer emulsion mixture.

The obtained latex binder had the following properties: $T_g$: around 32° C.: pH: 8.05, solids content: 50.87%, average particle size: 128 nm, and viscosity: 210 cps.

Example (Ex) 1

Binder composition of Ex 1 was prepared as follows:

Preparation of a clay suspension: 5.65 g HZ-200 phyllosilicate was added into 90 g $NH_4OH$ (25%) followed by adding 2.66 g DI water with agitation to form the clay suspension.

98.31 g phyllosilicate suspension obtained above was added into the BZ0587 latex binder as prepared above at <45° C., followed by adding 20.86 g DI water Ammonium hydroxide was further added to give a final pH=9.9. To this was added 41.12 g QR-1188 as prepared above (27.5%) at <45° C. followed by 10.64 g DI water. The obtained composition was filtered with 325 mesh to give the binder composition of Ex 1.

Ex 2

Binder composition of Ex 2 was prepared according to the same procedure for Ex 1, except for using 11.3 g HZ-200 phyllosilicate instead of 5.65 g HZ-200 phyllosilicate when preparing the clay suspension Ex 3

Binder composition of Ex 3 was prepared according to the same procedure for Ex 1, except that the clay suspension was prepared by adding 3.77 g HZ-200 phyllosilicate into 90 g $NH_4OH$ (25%) followed by adding 2.66 g DI water with agitation.

Ex 4

Binder composition of Ex 4 was prepared according to the same procedure for Ex 1, except for using 1.88 g HZ-200 phyllosilicate instead of 5.65 g HZ-200 phyllosilicate when preparing the clay suspension.

Comp Ex A

Binder composition of Comp Ex A was prepared where no clay suspension was added. Details are as follows: 90 g $NH_4OH$ (25%) and 2.66 g DI water were added into the BZ0587 latex binder as prepared above at <45° C., followed by adding 20.86 g DI water. Ammonium hydroxide was further added to give a final pH=9.9. To this was added 41.12 g QR-1188 as prepared above (27.5%) at <45° C. followed by 10.64 g DI water. The obtained composition was filtered with 325 mesh to give the binder composition of Comp Ex A.

Comp Ex B

Binder composition of Comp Ex B was prepared according to the same procedure for Ex 1, except that, instead of preparing the clay suspension, 90 g $NH_4OH$ (25%) and 2.66 g DI water were added into the BZ0587 latex binder, followed by directly adding 0.3% of HZ-200 phyllosilicate powder, by solids weight based on the wet weight of the latex binder (hereinafter "solids/latex").

Comp Ex C

Binder composition of Comp Ex C was prepared according to the same procedure for Ex 1, except for using 0.3% (solids/latex) diatomaceous instead of HZ-200 phyllosilicate when preparing the clay suspension.

Comp Ex D

Binder composition of Comp Ex D according to the same procedure for Ex 1, except for using 0.3% (solids/latex) bentonite (BENTONE LT available from Elementis Specialties) instead of HZ-200 phyllosilicate when preparing the clay suspension.

Ex 5

Binder composition of Ex 5 was prepared according to the same procedure for Ex 1, except for using the BX17-20 latex binder instead of the BZ0587 latex binder when preparing the binder composition.

Comp Ex E

Binder composition of Comp Ex E was prepared according to the same procedure as Comp Ex A, except for using the BX17-20 latex binder instead of the BZ0587 latex binder when preparing the binder composition.

Comp Ex F

Binder composition of Comp Ex F was prepared according to the same procedure for Comp Ex E, except for using 0.3% (solids/latex) bentonite (BENTONE LT available from Elementis Specialties) instead of HZ-200 phyllosilicate when preparing the clay suspension.

Comp Ex G

Binder composition of Comp Ex G was prepared according to the same procedure for Comp Ex E, except for using 0.3% (solids/latex) bentonite instead of HZ-200 phyllosilicate when preparing the clay suspension.

Table 1 summarizes the aqueous binder compositions of Exs 1-5 and Comp Exs A-G and results of the shelf-stability properties of these compositions as measured according to the test method described above. As shown in Table 1, the composition of Comp Ex B was prepared by post adding 0.3% HZ-200 phyllosilicate powder into the latex binder. The binder composition of Comp Ex B showed obvious settling after storage at room temperature for only about 2 days. It indicates that the shelf stability of a composition was not improved by post adding phyllosilicate powder directly. The compositions containing no clay showed poor shelf stability (Comp Exs A and E), no matter styrene-acrylic or pure acrylic latex was used as the binder. For example, obvious layering was observed for the composition of Comp Ex A after 1 month storage at room temperature and for the composition of Comp Ex E after 3 day storage at room temperature. For compositions of Comp Exs C and D, adding clay such as diatomaceous or bentonite showed no improvement in shelf-stability. In contrast, the compositions of Exs 1-5 comprising 0.3%, 0.6%, 0.2%, 0.1%, and 0.3% of HZ-200 phyllosilicate suspensions, respectively, all showed good shelf stability after storage at room temperature for 4 months or even longer. These results indicate that the shelf stability of aqueous coating compositions was significantly improved by post adding compositions the suspension of phyllosilicate dispersed in ammonia solution.

TABLE 1

| Examples | Binder | Clay | Clay Dosage* | Shelf-stability |
|---|---|---|---|---|
| Comp Ex A | BZ0587 | n/a | n/a | 1 month |
| Comp Ex B | BZ0587 | HZ-200 powder | 0.3% | Settling after 24 hours |
| Comp Ex C | BZ05-87 | Diatomaceous/ ammonia suspension | 0.3% | Settling after 1 month |
| Comp Ex D | BZ05-87 | Bentonite/ammonia suspension | 0.3% | 1 month |
| Ex 1 | BZ05-87 | HZ-200/ammonia suspension | 0.3% | 10 months |
| Ex 2 | BZ05-87 | HZ-200/ammonia suspension | 0.6% | 10 months |
| Ex 3 | BZ0587 | HZ-200/ammonia suspension | 0.2% | 4 months |
| Ex 4 | BZ0587 | HZ-200/ammonia suspension | 0.1% | 4 months |
| Comp Ex E | BX17-20 | n/a | n/a | 3 days |
| Comp Ex F | BX17-20 | Diatomaceous/ ammonia suspension | 0.3% | Settling after 1 month |
| Comp Ex G | BX17-20 | Bentonite/ammonia suspension | 0.3% | 1 month |
| Ex 5 | BX17-20 | HZ-200/ammonia suspension | 0.3% | 5 months |

*BZ0587 is a styrene-acrylic latex and BX17-20 is a pure acrylic latex;
** Clay dosage: by solids weight of clay based on the wet weight of the latex binder.

FIG. 1 provides viscosities versus storage time for phyllosilicate suspensions in DI water or in ammonia solution. As shown in FIG. 1, the viscosities of suspensions comprising 20% phyllosilicate in ammonia solution, 6% phyllosilicate in DI water, and 4% phyllosilicate in DI water, respectively, significantly increased over time. For example, the viscosity of 4% phyllosilicate/DI water suspension reached more than 2,000 cp after storage at room temperature for around 40 minutes. These high viscosity suspensions are difficult to handle in plants. Although 2% phyllosilicate/DI water suspension did not show significant viscosity increase, adding such low concentration of phyllosilicate water suspension into a latex binder will significantly decrease the solids content of the obtained binder composition. In contrast, the phyllosilicate/ammonia suspension comprising 15% by weight or less of phyllosilicate, based on the total weight of the suspension, demonstrated a slow viscosity increase and had a viscosity lower than 1,000 cp even after storage at room temperature for 6 hours. The results demonstrate that phyllosilicate can be dispersed into ammonia solution and then post-added into a latex binder during neutralizing stage of manufacturing the latex binder, which has no significant impact on the solids content of the latex binder.

Table 2 gives BF viscosities of the binder compositions of Exs 1 and 2 and Comp Ex A before and after heatage. After heatage at 50° C. for 2 weeks, the binder composition of Comp Ex A showed layering. In contrast, the viscosity of the binder compositions of Exs 1 and 2 comprising the phyllosilicate/ammonia suspension increased after heatage, but was still in a workable range.

TABLE 2

| Examples | Initial BF viscosity (room temperature) | BF viscosity after heatage (50° C., 2 weeks) |
|---|---|---|
| Comp Ex A | 126 cps | Layering |
| Ex 1 | 335 cps | 473 cps |
| Ex 2 | 481 cps | 797 cps |

Comp Exs H-J Binder Compositions

Binder compositions of Comp Exs H-J were prepared by adding different thickeners described in Table 3 into the composition of Comp Ex A, respectively. The shelf-stability properties of these binder compositions were evaluated according to the test method described above and results are listed in Table 3.

As shown in Table 3, when post adding 0.6% TT-615 or ASE-60 thickener, the obtained binder compositions of Comp Exs H and I both gelled. The binder composition of Comp Ex J containing RM12-8W thickener showed layering after about 3 months. It indicates that adding thickeners are less effective in improving shelf stability than adding phyllosilicate/ammonia suspension.

TABLE 3

| | Thickener | Type | Supplier | Dosage, by weight* | Shelf-stability at room temperature |
|---|---|---|---|---|---|
| Comp Ex H | ACRYSOL TT-615 | HASE | The Dow Chemical Company | 0.5% | Gelled immediately |
| Comp Ex I | ACRYSOL ASE-60 | ASE | | 0.5% | Gelled immediately |
| Comp Ex J | ACRYSOL RM-8W | HEUR | | 0.5% | Layering after about 3 months |

*based on the wet weight of the binder.

Coating Compositions

The binder compositions of Comp Ex A and Ex 1 were further formulated to FT-35 and FT-36 coating compositions, respectively, based on formulations described in Table 5. A commercial binder, FT-3427, was formulated to FT-28 coating composition based on formulations described in Table 5.

TABLE 5

| Coating Composition | | FT-28 | FT-35 | FT-36 |
|---|---|---|---|---|
| Millbase | Binder Composition | FT 3427 | Comp Ex A (no clay) | Ex 1 (0.3% clay) |
| | Binder dosage, g | 204 | 204 | 204 |
| | NOPCO NXZ, g | 0.9 | 0.9 | 0.9 |
| | TRITON CF-10, g | 1.218 | 1.218 | 1.218 |
| | OROTAN 901, g | 2.22 | 2.22 | 2.22 |
| | Ti-Pure R-902, g | 43.2 | 43.2 | 43.2 |
| | CC-500(CaCO$_3$), g | 317.4 | 317.4 | 317.4 |
| | Subtotal, g | 568.9 | 568.9 | 568.9 |
| Letdown | Ethanol, g | 12 | 12 | 12 |
| | NOPCO NXZ, g | 0.9 | 0.9 | 0.9 |
| | Water, g | 6.762 | 6.762 | 6.762 |
| | TEXANOL, g | 9.6 | 9.6 | 9.6 |
| | Ammonia (28%), g | 0.6 | 0.6 | 0.6 |
| | 2% HEC solution, g | 1.2 | 0 | 0 |
| Total, g | | 600 | 598.8 | 598.8 |

Properties of the above coating compositions and coating films made therefrom are listed in Table 6. As shown in Table 6, the initial KU viscosity of FT-36 comprising the binder composition of Ex 1 was comparable with that of FT-28 containing a commercial binder, indicating FT-36 is workable during application. FT-35 comprising the binder composition of Comp Ex A had a lower initial KU viscosity than FT-36.

As compared to those of FT-28 and FT-35, drying and DPUR performance of FT-36 were not compromised by post-adding phyllosilicate/ammonia suspension. In addition, FT-36 quickly developed the pendulum hardness, for example, within 1 day with the addition of the phyllosilicate/ammonia suspension. The early water washout resistance of FT-36 was significantly better than that of FT-28 and comparable with that of FT-35 containing no phyllosilicate.

In summary, by post adding phyllosilicate/ammonia suspension into a latex binder, the shelf stability of the obtained binder composition was significantly improved without compromising solids weight of the latex binder. The traffic paint compositions comprising the binder composition of the present invention also demonstrated significantly better early water washout resistance than conventional traffic paints, while maintaining paint performance such as drying time and pendulum hardness.

TABLE 6

| Coating Composition | | FT-28 | FT-35 | FT-36 |
|---|---|---|---|---|
| Overnight KU viscosity | | 88 | 79 | 92 |
| Dry-to-No-pickup time (50% RH, room temperature) | | 13 min | 11 min | 11 min |
| Dry-through time (50% RH, room temperature) | | 35 min | 32 min | 30 min |
| Dry-through time (89% RH, room temperature) | | 250 min | 300 min | 300 min |
| Pendulum hardness | 1 day | 17 | 10 | 10 |
| | 4 days | 17 | 11 | 11 |
| | 7 days | 17 | 11 | 11 |
| DPUR (Y − Y')/Y | | 0.63 | 0.63 | 0.60 |
| Early water washout resistance (breakup time) | | ~3 min | >10 min | >10 min |

What is claimed is:

1. A shelf-stable aqueous composition, comprising:
   (a) an aqueous dispersion of an anionically stabilized polymer,
   (b) a water soluble polyfunctional amine polymer, and
   (c) a suspension or dispersion of a phyllosilicate in a volatile base, wherein the concentration of the phyllosilicate in the suspension or dispersion of the phyllosilicate in the volatile base is from 1% to 18% by weight, based on the total weight of the suspension or dispersion of the phyllosilicate in the volatile base, and wherein the volatile base is used in an amount such that the composition has a pH wherein substantially all the polyfunctional amine polymer is in a non-ionic state.

2. The shelf-stable aqueous composition of claim 1, wherein the phyllosilicate in the composition is present in an amount of from 0.1% to 1% by solids weight, based on the weight of the aqueous dispersion of an anionically stabilized polymer.

3. The shelf-stable aqueous composition of claim 1, wherein the phyllosilicate comprises a sodium magnesium silicate, sodium lithium magnesium silicate, a sodium magnesium mixed silicate, laponite, magnesium lithium silicate or mixtures thereof.

4. The shelf-stable aqueous composition of claim 1, wherein the particle size of the phyllosilicate ranges from 10 nm to 500 nm.

5. The shelf-stable aqueous composition of claim 1, wherein the polyfunctional amine polymer has from 20% to 100% by weight of the monomer units containing an amine group, based on the weight of the polyfunctional amine polymer.

6. The shelf-stable aqueous composition of claim 1, wherein the polyfunctional amine polymer is present in an amount of from 0.1% to 4% by solids weight, based on the solids weight of the anionically stabilized polymer.

7. The shelf-stable aqueous composition of claim 1, having a solids content of from 40% to 65% by weight.

8. The shelf-stable aqueous composition of claim 1, wherein the anionically stabilized polymer is selected from an acrylic polymer, a styrene-acrylic copolymer, or mixtures thereof.

9. The shelf-stable aqueous composition of claim 1, wherein the pH of the composition is in the range of 9.5 to 14.

10. The shelf-stable aqueous composition of claim 1, wherein the volatile base is selected from ammonia, morpholine, a $C_1$-$C_5$ alkyl amine, 2-dimethylaminoethanol, N-methylmorpholine, ethylenediamine, or mixtures thereof.

11. The shelf-stable aqueous composition of claim 1, wherein the composition is obtained by
   providing the aqueous dispersion of an anionically stabilized polymer,
   providing the water soluble polyfunctional amine polymer;
   dispersing the phyllosilicate in a volatile base to form a suspension or dispersion; and
   admixing the aqueous dispersion of an anionically stabilized polymer, the water soluble polyfunctional amine polymer, and the phyllosilicate suspension or dispersion.

12. A process of preparing a shelf-stable aqueous composition, comprising admixing:
   (a) an aqueous dispersion of an anionically stabilized polymer,
   (b) a water soluble polyfunctional amine polymer, and
   (c) a suspension or dispersion of a phyllosilicate in a volatile base to form the shelf-stable aqueous composition, wherein the concentration of the phyllosilicate is from 1% to 18% by weight, based on the total weight of the suspension or dispersion, and wherein the volatile base is used in an amount such that the composition has a pH wherein substantially all the polyfunctional amine polymer is in a non-ionic state.

13. The process of claim 12, wherein the aqueous dispersion of anionically stabilized polymer dispersion and the phyllosilicate suspension or dispersion are firstly mixed, and then mixed with the polyfunctional amine polymer.

14. A coating composition comprising a shelf-stable aqueous composition of claim 1.

15. The coating composition of claim 14, further comprising pigments, fillers, thickeners, coalescents, colorants, dispersants, wetting agents, defoamers, or mixtures thereof.

16. The coating composition of claim 1 having a shelf-stability of at least 3 months when stored at room temperature.

* * * * *